United States Patent [19]
Rivlin et al.

[11] Patent Number: 5,686,180
[45] Date of Patent: Nov. 11, 1997

[54] WATER ACTIVATED ADHESIVE AND PAPER-PLASTIC TAPE CONTAINING SAME

[75] Inventors: Jonathan B. Rivlin, East Brunswick; Sam B. Vodoor, Parlin, both of N.J.; William A. Herring, Appelton, Wis.

[73] Assignee: Central Products Company, Linden, N.J.

[21] Appl. No.: 316,261

[22] Filed: Sep. 29, 1994

[51] Int. Cl.$^6$ .................................................. B32B 7/12
[52] U.S. Cl. ........................ 428/350; 428/354; 428/355; 428/352
[58] Field of Search .................................. 428/343, 350, 428/346, 349, 352, 353, 354, 355; 524/52

[56] References Cited

U.S. PATENT DOCUMENTS

| | | | |
|---|---|---|---|
| 4,041,202 | 8/1977 | Williams | 428/138 |
| 4,351,877 | 9/1982 | Williams | 428/350 |
| 4,557,971 | 12/1985 | Williams | 428/343 |
| 4,994,146 | 2/1991 | Soerens | 162/112 |
| 5,156,904 | 10/1992 | Rice et al. | 428/219 |
| 5,190,798 | 3/1993 | Bloch | 428/40 |
| 5,244,702 | 9/1993 | Finestone et al. | 428/34.3 |
| 5,382,473 | 1/1995 | Musclow et al. | 428/353 |
| 5,401,557 | 3/1995 | Inomata et al. | 428/110 |
| 5,411,845 | 5/1995 | Robinson | 430/531 |
| 5,453,326 | 9/1995 | Siddiqui | 428/474.4 |

*Primary Examiner*—Ana Woodward
*Attorney, Agent, or Firm*—Pennie & Edmonds LLP

[57] ABSTRACT

The present invention relates to an adhesive containing a primary water soluble adhesive agent, an adhesion promoter for providing initial tack to composition, and a water soluble polymer comprising an imine compound in an amount sufficient to provide adhesion to polymeric films and preferential anchorage of such films to a substrate. The primary adhesive agent is generally present in the amount of about 2 to 60% by weight, the adhesion promoter is generally present in an amount of about 5 to 30% by weight and the imine compound is generally present in the amount of about 0.1 to 7% by weight of the adhesive, with the balance being water. The adhesive include one or more of the following optional components: a primary chelating agent in an amount of about 0.5 to 6% by weight, a thinning agent in an amount of up to about 1% by weight, or a secondary chelating agent, a wetting agent, or a humectant, each in an amount of up to about 3% by weight of the adhesive. Also, the invention relates to a method of making the adhesive, the adhesive produced by the method and articles such as package sealing tapes having a substrate such as a plastic film with one of the adhesives described above provided on at least a portion and preferably substantially all of one surface of the plastic film.

28 Claims, 2 Drawing Sheets

WATER ACTIVATED ADHESIVE AND PAPER-PLASTIC TAPE CONTAINING SAME

FIELD OF THE INVENTION

The present invention relates to new water activated adhesives which are particularly useful when supported on a substrate such as a plastic film. A preferred application of the adhesive is on a substrate for use as a paper-film laminate tape for sealing cartons and other articles. This adhesive is unique in that it is both water soluble and able to bond to the plastic film which is used in the paper-plastic laminate.

BACKGROUND ART

Adhesive tapes for sealing cartons or carton flaps during manufacture or after the carton is filled are well known in the art. One of the most common constructions is a standard kraft paper tape which includes a water soluble or water activated adhesive on one side. Rolls of this tape can be dispensed through machines which rely on the longitudinal stiffness of the tape to unwind it from the roll and force it through a tape moisturizing component. This component includes a water reservoir which moistens the adhesive surface of the tape and readies it for application to the carton. Often, the tape moisturizing component includes a heating bar which enhances the activation of the moistened adhesive through the use of heat, and facilitates wet out of the adhesive.

Various improvements to this type of tape have been developed over the years to meet differing requirements in the manufacture and sealing of cartons. For example, multiple layered tapes using reinforcing fibers generally made of fiberglass and extending longitudinally and/or angularly across this tape to increase its strength are conventionally used for higher closure strength requirements. Although the tape is harder to tear due to the reinforcing fibers, this construction results in the somewhat rough and uneven surface both along the top and bottom of the tape as well in a tape construction that is somewhat thicker than the conventional kraft tape. This uneven surface and thicker tape causes a standard size roll to be of a shorter length for any given diameter compared to conventional tapes.

Plastic films are also known in the art to provide advantages when used as a strength layer in tape constructions. One problem in using plastic film is that it cannot hold a water soluble or water activatable adhesive. Thus, the plastic film can be used as a strength layer but the water based adhesive is generally applied to a paper layer so that the overall construction can be dispensed through conventional or standard tape dispensing machines.

Recognizing this problem in adhering the water soluble adhesive to the plastic film, Williams in U.S. Pat. No. 4,351,877 disclosed a multiple layered laminated tape having an upper strength layer made of a film of prestretched polypropylene which is laminated to a lower carrier layer of kraft paper. The carrier layer includes a coating of a water soluble adhesive which is used to apply the tape to a carton. After application, the plastic layer can be stripped away from the carton due to the relatively low bond between the plastic film and the paper carrier, so that the package may be easily opened after removal of the plastic film.

Similarly, Bloch U.S. Pat. No. 5,190,798 discloses a paper plastic film fiber glass reinforced sealing tape which includes a paper inner ply whose exposed face is pregummed and a synthetic plastic film outer ply which is laminated by a water based adhesive to the inner ply. Sandwiched between the inner and outer plies is a longitudinal array of fiberglass strands which serve to reinforce the tape. After a corrugated article is sealed by the tape, it is possible to remove the outer ply by stripping it from the tape, again due to the relatively low bond between the plastic film and the inner paper layer.

In addition, plastic film tape is commonly available on the market, but this tape generally has a hot melt pressure sensitive adhesive applied to one side thereof for attaching the tape to the carton. As noted above, it is not known in the art how to successfully apply a water activated adhesive to a plastic tape so that the tape can be dispensed through standard paper/gum dispensing machines without flaking of the adhesive from the tape. This construction would also omit the use of the paper layer to which the adhesive is applied. The present invention provides one solution to this problem.

SUMMARY OF THE INVENTION

The present invention relates to an adhesive comprising a primary water soluble adhesive agent, an adhesion promoter for providing initial tack to composition, and a water soluble polymer comprising an imine compound in an amount sufficient to provide adhesion to polymeric films and preferential anchorage of such films to a substrate.

In this adhesive, the primary adhesive agent is generally present in the amount of about 2 to 60% by weight, the adhesion promoter is generally present in an amount of about 5 to 30% by weight and the imine compound is generally present in the amount of about 0.1 to 7% by weight of the adhesive, with the balance being water. Preferably, wherein the primary adhesive agent is starch and is present in an amount of about 30 to 45% by weight, the adhesion promoter is a polyacrylamide and is present in an amount of about 10 to 20% by weight, and the imine compound is a polyethyleneimine and is present in an amount of about 0.5 to 2% by weight.

The adhesive may additionally include more of the following optional components: a primary chelating agent in an amount of about 0.5 to 6% by weight, a thinning agent in an amount of up to about 1% by weight, or a secondary chelating agent, a wetting agent or a humectant, each present in an amount of up to about 3% by weight of the adhesive. Preferably, the primary chelating agent is sodium chloride and is present in an amount of about 1 to 3% by weight, the secondary chelating agent is EDTA and is present in an amount of about 0.01 to 1.5% by weight, the thinning agent is muriatic acid and is present in an amount of about 0.01 to 0.5% by weight, and the wetting agent is polyvinyl alcohol and is present in an amount of about 0.01 to 2% by weight of the adhesive.

The invention further relates to a method for making an adhesive which comprises mixing a primary water activated adhesive agent and a water soluble imine compound with water to form a mixture, cooking the mixture at between about 175° to 210° F. for about 2 to 30 minutes, adding an adhesion promoter to the cooked mixture to form a second mixture, and cooking the second mixture at between about 175° and 210° F. for between about 5 and 40 minutes to form an adhesive. In addition, one or more chelating agents can be added to the water prior to the addition of the primary adhesive agent and imine compound.

Preferably, the mixture is heated to about 175° to 210° F. before adding the primary adhesive agent and imine compound. Also, a wetting agent can be added along with the adhesion promoter, if desired, or thinning agent can be added with the primary adhesive agent and imine compound.

Advantageously, the first cooking step is conducted between about 188° and 200° F. for about 8 to 20 minutes, and the second cooking step is conducted between about 188° and 200° F. for between about 12 and 30 minutes, with the second cooking stage being conducted for a longer time than the first cooking stage.

The present invention also relates to the adhesives made by the previously described method.

Another aspect of the invention is an article for attachment to an object which comprises a substrate having upper and lower surfaces and one of the adhesives described above on at least a portion of the lower surface of the substrate. Advantageously, the substrate is paper, a plastic film, a foil, or a laminate thereof. The substrate may include reinforcement, such as fiberglass, yarn, a scrim or an additional substrate.

The most preferred substrate is a plastic film, where the adhesive is provided on substantially all of the lower surface of the plastic film. If desired, the substrate can carry graphic information so that the article can be used as a label or stamp. Also, the substrate may be in the form of a film so that the article can be used as a tape, wallpaper, or a liner.

Advantageously, the article is a package sealing tape comprising a plastic film having upper and lower surfaces and one of the adhesives described above provided on at least a portion and preferably substantially all of the lower surface of the plastic film. Advantageously, a paper layer is bonded to the upper surface of the plastic film.

Preferably, the paper layer comprises kraft paper, and is bonded to the plastic film with a conventional water-based adhesive. When the water activated adhesive of the invention has a stronger bond to the substrate than to the plastic film, the plastic film of the tape is strippable from the package. Alternatively, when the water activated adhesive has stronger bond to the plastic film than to the substrate, the tape is not strippable from the package.

BRIEF DESCRIPTION OF THE DRAWINGS

A further and more detailed explanation leading to a more complete understanding of the present invention may be obtained by reviewing the attached drawing figures, which illustrate preferred embodiments of the invention, and in which.

DETAILED DESCRIPTION OF THE INVENTION

The present invention specifically relates to an improved high strength paper-plastic laminate tape which includes a unique water activated adhesive on the lower surface of the plastic film of the laminate. This construction is highly improved in that the water activated glue has an exceptionally long open time, with substantially instant tack, while the outer paper layer is smooth and can be printed with indicia, company logos or other information. As noted above, depending upon the choice of film and adhesive, the tape can be strippable wherein the plastic film and paper can be removed from the carton, or non-strippable wherein the tape can only be removed with great difficulty and with ripping or other damage to the carton. The specific details regarding the invention now follow.

Figure 1:
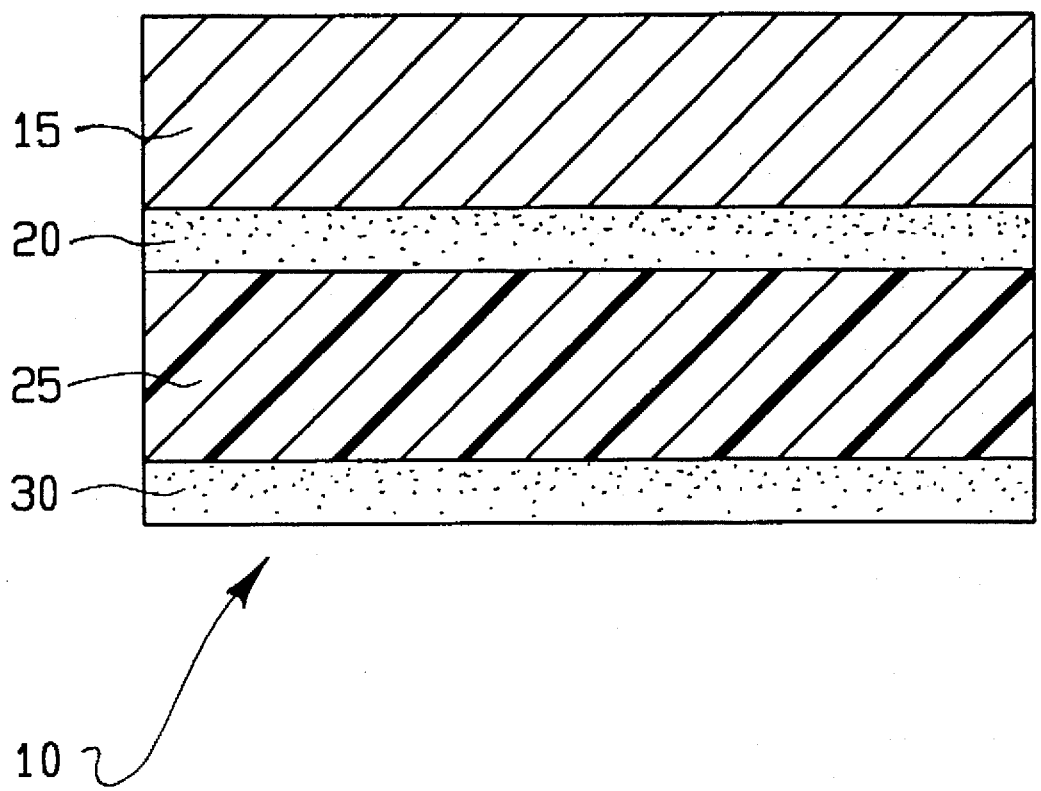
FIG. 1 is an enlarged cross-sectional view of the present sealing tape with a thickness of each layer exaggerated for the purposes of clarity.

Referring now to FIG. 1, it is seen that the tape (10) of the invention comprises 4 layers. The outer layer (15) can be made of any type paper. Preferably, this layer is made of conventional kraft paper, since it is commonly known and understood by those of ordinary skill in the art that this material is highly suitable for use in sealing packages. In addition, the outer surface of this paper layer (15) is relatively smooth and is highly receptive to any type of conventional printing using standard printing inks.

The paper layer (15) is laminated by means of a conventional water-based adhesive (20) to reinforcing film (25) of a synthetic plastic material. Adhesive layer (20) can be a water-based polyacrylate copolymer adhesive or any other water-based adhesive having similar bonding properties and which has an affinity both for paper layer (15) and plastic film (25). Since the main purpose of paper layer (15) is to provide an easily printable surface and also to provide additional weight and stiffness to the overall tape construction, the strength of the bond between the paper and plastic film in this portion of the tape is not important. Thus, provided that the paper can remain secured to the film layer during the manufacturing, printing, dispensing and carton applying steps, any adhesive which can withstand these operations would be suitable. Unlike prior art tape constructions, the bond between the paper layer and the plastic film is of no concern with respect to the provision of a strippable layer or the bond of the tape to the carton.

The plastic reinforcing film (25) can be made of any plastic material. Preferably, the film is biaxially oriented. Film materials suitable for this purpose include polypropylene, polyethylene, polystyrene, polyacrylate, nylon, a polyester such as MYLAR, or a coextrusion of any combination of the above. The selection of the particular plastic film material is important in providing either a strippable tape or a non-strippable tape. For example, single layer homopolymer biaxially oriented polypropylene or coextruded polypropylene/polyethylene copolymers do not adhere as well to the underlying water activated adhesive than that adhesive adheres to the corrugated substrate.

Accordingly, after the tape has been applied to the package and the adhesive has dried, the plastic film and paper can be removed by stripping from the package. For corrugated cartons which are to be recycled, the plastic film can be removed to facilitate the recycling of the corrugated media. Typical commercial films which can be used when a strippable tape is desired include the following: Standard Tape Base BOPP (i.e., biaxially oriented polypropylene) from Simpro, Galveston, Tex. or Formosa Plastics, Livingston, N.J. When a strippable tape is used, after it has been stripped from the corrugated package, the remaining portion of the water activated adhesive is easily removed from the package in the normal repulping operation.

When a non-strippable tape is desired, the plastic film material is selected to have a bond which is essentially equal between either the film or the corrugated media. Thus, after the tape has been applied and the water component of the adhesive layer has dried, the tape cannot be removed without ripping or damaging the carton. A specific type of material which can be used as the plastic layer would be a multi-layer homopolymer with a printable surface such as Bicor SPW from Mobil Chemical Co., Pittsford, N.Y. or CCO from Borden Proponite Division, North Andover, Mass. As these films are specifically designed to accept cold seals with aqueous adhesives, it will tear the package before it can be stripped therefrom.

The water activated adhesive layer (30) is formulated of a special adhesive that is designed to bond both to the plastic film and to a corrugated or paper substrate. This adhesive is formulated from the following components.

Chelating agents are used to sequester any metal ions which may be present in the adhesive. As a primary chelating agent, sodium chloride can be used in a specifically preferred amount of about 2% by weight of the composition. Another material which can be used as the primary chelating agent is EDTA.

A secondary chelating agent can also be used to enhance the performance of the primary chelating agent. A specifically preferred secondary chelating agent includes EDTA and that can be used in an amount up to 0.5% by weight of the composition. Another secondary chelating agent is urea.

The primary adhesive agent of the composition is starch, a well known material for water-based gum adhesives. This component is used in amount of approximately 37% by weight of the overall composition. A preferred starch is corn starch. Other components that can be used as the main adhesive agents include dextrin, animal glue or potato starch.

The viscosity of the adhesive can be controlled by adding a thinning agent in a very small amount, generally less than 1% or even as little as a few drops. One preferred thinning agent is hydrochloric acid (also called muriatic acid). Other thinning agents that can be used include enzymes such as alpha amylase.

An important component for obtaining bonding to the plastic film is an water soluble imine compound having a molecular weight of between about 50,000 and 100,000. This bonding agent also has a preferential anchorage of the coating to the paper after the adhesive has dried. Generally, about 1% by weight of the composition will be of this bonding agent. A preferred bonding agent is Polymin P from BASF, Parsippany, N.J. Other bonding agents that can be used include Morton Solution from Morton Chemical, Chicago, Ill.

An adhesion promoter is also added to the formulation to promote bonding between the tape and the substrate. For this invention, it has been found that a polyacrylamide polymer having a molecular weight of less than about 100 is preferred. This component is used in a amount of approximately 16% by weight of the overall formulation. Instead of the preferred material, polyacrylates can be used as adhesion promoters.

The adhesive's wettability and coatability properties are enhanced by the addition of a wetting agent. Preferably, polyvinyl alcohol is used in amount of about 1% or less. Another wetting agent is urea. Although this component also can be used as the second chelating agent, when it is intended to perform both functions, it is used in a greater amount than if used for either function alone.

The balance of the composition is water and for the preferred formulation it is present in the amount of about 43 weight percent.

Figure 2:
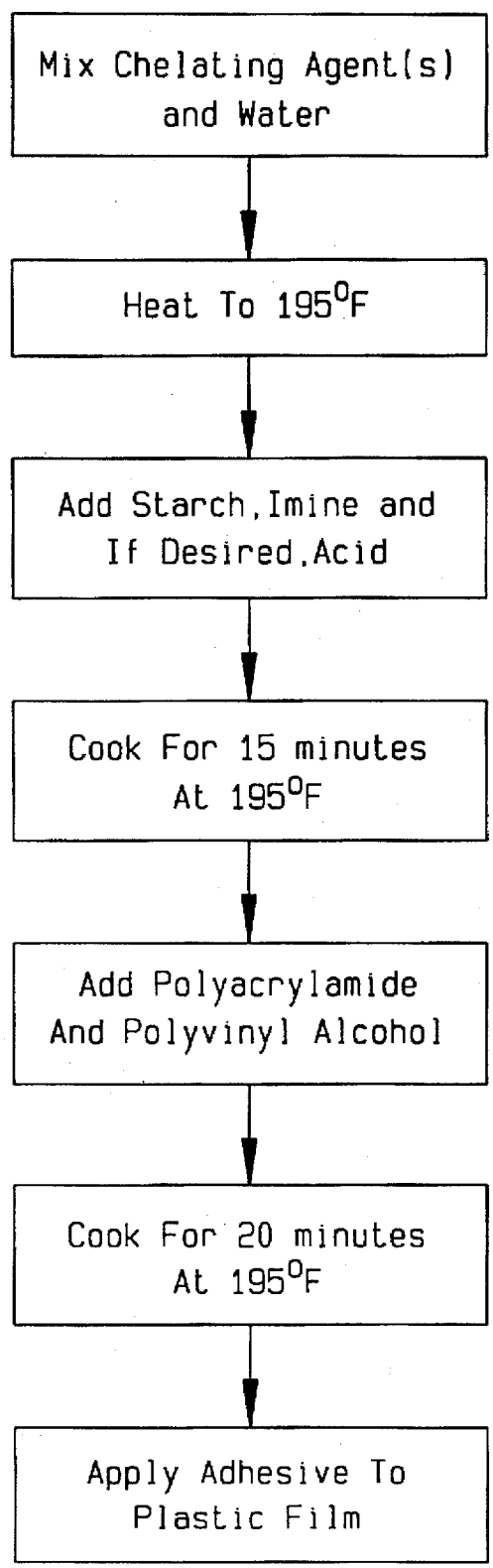
FIG. 2 is a schematic of the method steps for preparing the water activated adhesive of the present invention.

FIG. 2 illustrates the method by which the present adhesive can be prepared. Initially, the chelating agent or agents in the desired proportions are mixed with the water and heated to a temperature of about 195°. The starch is next added and mixed into the formulation with the imine compound. The muriatic acid is added as necessary to thin the composition, if desired. The overall mixture is then cooked at 195° F. for approximately 15 minutes. Thereafter, the polyacrylamide and polyvinyl alcohol components are added and mixed into the formulation. This overall mixture is then cooked at 195° F. for an additional 20 minutes to obtain the final adhesive polymer. This adhesive is then applied to the plastic film using conventional gum adhesive application equipment.

The thickness of the paper layer (15) and plastic film layer (25) are not critical to the invention. Typical plastic thicknesses will be between 1 and 2 mils and generally about 1.2 mils. As noted above, the paper layer (15) is merely present to provide a printing surface so that its thickness can vary from about 0.5 mils on the low end to as high as 2 or 3 mils when a overall tape thickness on the order of conventional paper tapes is desired. This thicker tape will allow dispensing from conventional equipment such as a Better Pack model 555L tape dispenser.

However, it is often desired to have a thinner overall tape to provide additional advantages such as less frequent tape roll changes in the dispensing machine, lower inventory of tape and the like because more tape is provided per roll. In addition, the tape is lighter weight, which results in lower shipping costs. However, the thinner tape constructions would require application through more modern tape dispensing machines, such as the Marsh Ultra Gummed Tape Dispenser or Better Pack models 754 or 755.

The overall construction is highly advantageous in that after the adhesive is moistened it will have an open time of about 1.5 to 15 seconds or longer as desired for the particular application. The plastic film acts to contain the moisture and prevent it from wetting out the paper, which leads to the high open time of the product. In addition, the formulation provides essentially instantaneous tack when applied to the paper, corrugated or fiberboard. As noted above, after the water has dried from the substrate, the tape will be securely attached to the carton. When a strippable formulation is used, the plastic film and outer paper layer can be easily stripped or, when a non-strippable version is applied, the tape cannot be removed without damaging the carton. Thus, based on the selection of plastic film layer, the person of ordinary skill in the art is provided with a wide range of different performance of tapes for use in different carton sealing applications.

If desired, polymers such as water activated polymers or dextrine can be utilized as alternatives to starch. Also, conventional humectants such as sodium nitrate or urea can be included in the formulation.

EXAMPLES

The preferred embodiments of the invention are further illustrated by the following examples in which all parts are given as parts by weight unless otherwise specified.

Example 1

A first sample of tape was prepared utilizing 30 lb recycled Kraft paper as layer (15) and a 1.2 mil thick biaxially oriented polypropylene film as plastic layer (25). A conventional water-based polyacrylate adhesive was used as adhesive (20) whereas the preferred water activated adhesive of the invention as described above in the preferred embodiment was used as layer (30).

The tapes were moistened with water utilizing a conventional Better Pack 555L tape dispensing machine and applied to corrugated cartons which had been filled to a weight of 40 lbs. The cartons were sealed on the top and bottom with only a single strip of tape and then testing was conducted using the United Parcel preshipment cycle followed by tumbled drum testing on 3 lots of identical packages. The test packages were sealed on the top and bottom with one strip of tape with a 3 inch overhang and was thereafter conditioned for 24 hours to 72° F. and 50% relative humidity.

Three packages which were provided with the tape of example 1 were subjected to vibration and free fall drop testing in according with U.P.S. Tariff No. 5 followed by 5 tumbled drum rotations or to failure of the package. Results are as follows:

TEST MATERIALS

FIBERBOARD TEST CARTON SHIPPERS

| Manufacturer | Squire Corrugated Container Corp, South Plainfield, NJ |
| --- | --- |
| Style | Regular Slotted Carton (RSC) |
| Size (ID) | 17" × 8-½" × 15-¼" |
| Certificate | 200# |
| Corrugation | Vertical "C" flute |
| Facing | Bleached-kraft (visual exam only) |
| Mfr's joint | Glued |
| ID | J-29-A; 6266 |

INTERIOR COMPONENTS

1. Weights - 18 required (2/shipper) Material - Lead Mass - approximately 15# each The weights are placed in pairs within Details #2, the cartons sealed and inserted into the Squire test cartons, surrounded on four sides with rigid paper dunnage to maintain the position of, and cushion, the weights.

2. Inner cartons - 9 required (1/shipper) Material - 275# test; "BC" flute; kraft-kraft liners; RSC style Size (OD) - 8½"×8½"×12"

Contain Details #1 lead weights.

3. Dunnage Material - rigid paper fill Mass - approximately 10#/shipper

Void space filler is packed snugly around Details #2 to cushion and stabilize the weights, and to completely fill all empty space within the shipper test cartons.

TEST METHODS

1. VIBRATION TEST

With the shippers placed on the table of the vibration tester in normal shipping orientation, they are vibrated at a frequency of 215 CPM (+1G) for a period of 68 minutes which results in a total of 14,200 vibratory impacts. After the first 34 minutes of vibration, the packages are rotated 90° for the final 34 minutes.

2. FREE FALL DROP TESTS

Following the vibration test, each shipper is subjected to ten (10) free fall drops from a height of 24" onto the following box parts:

| 1st Drop | Bottom manufacturers joint corner |
| --- | --- |
| 2nd Drop | Shortest edge radiating from the corner of the 1st drop |
| 3rd Drop | Next shortest edge radiating from the coroner of the 1st drop |
| 4th Drop | Longest edge radiating from the corner of the 1st drop |
| 5th Drop | Flat onto one of the smallest panels |
| 6th Drop | Flat onto the opposite small panel |
| 7th Drop | Flat onto one of the medium panels |
| 8th Drop | Flat onto the opposite medium panel |
| 9th Drop | Flat onto one of the largest panels |
| 10th Drop | Flat onto the opposite large panel |

3. TUMBLE DRUM TEST

Following the free fall drop test, each shipper is subjected to five (5) full rotations individually in the tumble drum, or to failure.

Example 2

A second tape was prepared in accordance with the invention utilizing 25 lb recycled kraft paper as paper layer (15) and the same 1.2 mil biaxially oriented polypropylene film as the plastic layer (25). The packages which were sealed with the tapes of examples 1 and 2 were compared to a 235 grade fiberglass reinforced tape as a control. Results were as follows:

TEST RESULTS

VIBRATION & FREE FALL

Full test results following vibration and free fall impact test cycles are summarized below:

| TAPE | TEST RESULTS |
| --- | --- |
| Example 1 | #1A - no damage; |
|  | #1B - no damage; |
|  | #1C - tape failure at a single bottom edge |
| Example 2 | #2A - no damage; |
|  | #2B - no damage; |
|  | #2C - tape seam loose on bottom edge one side and split up the flap seam 1: on opposite bottom edge; |
| Example 3 | #3A - tape suffered serrated tear at bottom edge and split up flap seam 1" at same edge; |
|  | #3B - tape suffered serrated tear at bottom edge; |
|  | #3C - bottom tape split ½" up flap seam. |

TUMBLE DRUM

Following the vibration and free fall drop tests, the packages were assembled for tumble drum testing, with the following results:

| TAPE | TEST RESULTS |
| --- | --- |
| Example 1 | #1A - no tape damage; |
|  | #1B - no additional tape damage; |
|  | #1C - no damage; |
| Example 2 | #2A - no tape damage; |
|  | #2B - no tape damage; |
|  | #2C - no additional tape damage; |
| Control | #3A - second bottom tape seam failure at edge; |
|  | #3B - all four (4) tape seams tore at 7" tear generated on bottom flap seam; |
|  | #3C - top tape split diagonally opposite edge and box failed during 4th rotation. |

In summary, the tapes of the invention performed comparably, and extraordinarily, well, as the complete test cycle, comprising vibration, drop and tumble components, represents a rigorous trial for any package closure method. The examples of the invention were both able to execute the performance tests with minimal structural damage, and maintained physical integrity, beyond that of the package material itself.

Accordingly, the unique construction of the tapes according to the present invention have been demonstrated to show that they have an enhanced burst strength and superior strength characteristics with respect to tear resistance. This adhesive has a very long open time with instant tack and as well as a wide range of water tolerance. Also, the adhesive works equally well with flooded or starved water reservoirs on conventional film dispensing apparatus. The combination of the paper-film lamination provides a smooth consistent caliber thickness which has an excellent printing surface for use with conventional printing apparatus and inks.

The tapes of the invention can be made in a conventional manner. The substrate is provided in a full width of between about 36 and 96". Then, the adhesive is formulated as described above and applied to one side of the substrate by a roll coater, a slot die, by extrusion or by other conventional techniques which are well known to those of ordinary skill in the art. The coated tape is then dried, cracked and shear cut to the desired width of the tape.

The present tape can be used to seal all carton stock whether recycled or all virgin materials and provide excellent barrier properties as well due to the polymer film layer. The characteristics of the tape allow it to be of relatively light weight with longer roll lengths, fewer roll changes, less storage space, lower shipping costs and less inventory as a result. In addition, as noted above, strippable and or non-strippable varieties can be easily provided depending on the selection of the polymer film which is used in the tape.

Alternatively, a wide variety of substrates can be used for the present adhesive depending upon the specific end use of the article. If desired, a paper substrate having graphic indicia on its upper surface and the present adhesive on its lower surface can be used to form stamps, wallpaper, label, shelf liners or other articles that can be attached to an object. Other substrates can be used for particular applications. For example, plastic films, metal foils or combinations thereof can be used to form specialty articles. All these variations are contemplated by the present invention.

What is claimed is:

1. A package sealing tape for attachment to an object, which comprises a substrate of a plastic film having upper and lower surfaces and on at least a portion of the lower surface of the substrate an adhesive composition comprising: a first component of a water activated adhesive agent in an amount sufficient to provide adhesive properties to the composition; a second component of an adhesion promoter for providing initial tack to composition; and a third component of a bonding agent comprising a water soluble imine compound in an amount sufficient to provide additional adhesion of the substrate to the object, wherein the first, second, and third components are different, and said adhesive composition being activated by contact with water for application to the object.

2. The tape of claim 1 which further comprises reinforcement for the substrate.

3. The tape of claim 2 wherein the reinforcement is fiberglass, yarn, a scrim or an additional substrate.

4. The article of claim 1 wherein the substrate carries graphic information so that the article can be used as a label or stamp.

5. The tape of claim 1 wherein the adhesive composition has a stronger bond to the substrate than to the object so that the plastic film is strippable from the object.

6. The tape of claim 1 wherein the adhesive composition has a stronger bond to the object than to the substrate.

7. The tape of claim 1 wherein the water activated adhesive agent is present in the adhesive composition in an amount of about 2 to 60% by weight, the adhesion promoter is present in an amount of about 5 to 30% by weight and the imine compound is present in the amount of about 0.1 to 7% by weight of the adhesive composition, wherein the balance of the adhesive composition is water.

8. The tape of claim 1 wherein the water activated adhesive agent is starch, the adhesion promoter is a polyacrylamide and the imine compound is a polyethylene imine.

9. The tape of claim 8 wherein the water activated adhesive agent is present in the adhesive composition in an amount of about 30 to 45% by weight of the composition, the adhesion promoter is present in an amount of about 10 to 20% by weight of the composition and the imine compound is present in an amount of about 0.5 to 2% by weight of the composition.

10. The tape of claim 1 wherein the adhesive composition further comprises one or more of the following additional components: a primary chelating agent in an amount of about 0.5 to 6% by weight; a secondary chelating agent in an amount of about 0 to 3% by weight; a thinning agent in an amount of up to about 1% by weight; a wetting agent in an amount of up to about 3% by weight; or a humectant in an amount of up to about 3% by weight; each weight calculated based upon the weight of the adhesive composition.

11. The tape of claim 10 wherein the primary chelating agent is sodium chloride and is present in an amount of about 1 to 3% by weight; the secondary chelating agent is EDTA and is present in an amount of about 0.01 to 1.5% by weight; the thinning agent is muriatic acid and is present in an amount of about 0.01 to 0.5% by weight; and the wetting agent is polyvinyl alcohol and is present in an amount of about 0.01 to 2% by weight.

12. A package sealing tape for attachment to an object, which comprises a substrate of a polymeric film having upper and lower surfaces and on at least a portion of the lower surface of the substrate an adhesive composition comprising: a first component of a water activated adhesive agent in an amount sufficient to provide adhesive properties to the composition; a second component of an adhesion promoter in an amount sufficient for providing initial tack to composition; and a third component of a bonding agent comprising a water soluble imine compound in an amount sufficient to provide adhesion to the polymeric film and preferential anchorage of the film to the object, wherein the first, second and third components are different, and said adhesive composition being activated by contact with water for application to the object.

13. The tape of claim 12 wherein the adhesive composition is provided on substantially all of the lower surface of the polymeric film.

14. The tape of claim 12 wherein the water activated adhesive agent is present in the adhesive composition in an amount of about 2 to 60% by weight, the adhesion promoter is present in an amount of about 5 to 30% by weight and the imine compound is present in the amount of about 0.1 to 7% by weight of the adhesive composition, wherein the balance of the adhesive composition is water.

15. The tape of claim 12 wherein the water activated adhesive agent is starch, the adhesion promoter is a polyacrylamide and the imine compound is a polyethylene imine.

16. The tape of claim 15 wherein the water activated adhesive agent is present in the adhesive composition in an amount of about 30 to 45% by weight of the composition, the adhesion promoter is present in an amount of about 10 to 20% by weight of the composition and the imine compound is present in an amount of about 0.5 to 2% by weight of the composition.

17. The tape of claim 12 wherein the adhesive composition further comprises one or more of the following additional components: a primary chelating agent in an amount of about 0.5 to 6% by weight; a secondary chelating agent in an amount of about 0 to 3% by weight; a thinning agent in an amount of up to about 1% by weight; a wetting agent in an amount of up to about 3% by weight; or a humectant in an amount of up to about 3% by weight; each weight calculated based upon the weight of the adhesive composition.

18. The tape of claim 17 wherein the primary chelating agent is sodium chloride and is present in an amount of about 1 to 3% by weight; the secondary chelating agent is EDTA and is present in an amount of about 0.01 to 1.5% by weight; the thinning agent is muriatic acid and is present in an amount of about 0.01 to 0.5% by weight; and the wetting agent is polyvinyl alcohol and is present in an amount of about 0.01 to 2% by weight.

19. A package sealing tape for attachment to an object, said tape comprising a substrate of a plastic film having upper and lower surfaces and on at least a portion of the lower surface of the substrate an adhesive composition comprising: a first component of a water activated adhesive agent in an amount sufficient to provide adhesive properties to the composition; a second component of an adhesion promoter in an amount sufficient for providing initial tack to composition; and a third component of a bonding agent comprising a water soluble imine compound in an amount sufficient to provide adhesion to the plastic film and preferential anchorage of the film to the object, where in the first, second and third components are different, and said adhesive composition being activated by contact with water for application to the object.

20. The tape of claim 19 further comprising a paper layer bonded to the upper surface of the plastic film.

21. The tape of claim 20 wherein the paper layer comprises kraft paper.

22. The tape of claim 20 wherein the paper layer is bonded to the plastic film with a water-based adhesive.

23. The tape of claim 19 wherein the adhesive composition is provided on substantially all of the lower surface of the plastic film.

24. The tape of claim 19 wherein the water activated adhesive agent is present in the adhesive composition in an amount of about 2 to 60% by weight, the adhesion promoter is present in an amount of about 5 to 30% by weight and the imine compound is present in the amount of about 0.1 to 7% by weight of the adhesive composition, wherein the balance of the adhesive composition is water.

25. The tape of claim 19 wherein the water activated adhesive agent is starch, the adhesion promoter is a polyacrylamide and the imine compound is a polyethylene imine.

26. The tape of claim 25 wherein the water activated adhesive agent is present in the adhesive composition in an amount of about 30 to 45% by weight of the composition, the adhesion promoter is present in an amount of about 10 to 20% by weight of the composition and the imine compound is present in an amount of about 0.5 to 2% by weight of the composition.

27. The tape of claim 19 wherein the adhesive composition further comprises one or more of the following additional components: a primary chelating agent in an amount of about 0.5 to 6% by weight; a secondary chelating agent in an amount of about 0 to 3% by weight; a thinning agent in an amount of up to about 1% by weight; a wetting agent in an amount of up to about 3% by weight; or a humectant in an amount of up to about 3% by weight; each weight calculated based upon the weight of the adhesive.

28. The tape of claim 27 wherein the primary chelating agent is sodium chloride and is present in an amount of about 1 to 3% by weight; the secondary chelating agent is EDTA and is present in an amount of about 0.01 to 1.5% by weight; the thinning agent is muriatic acid and is present in an amount of about 0.01 to 0.5% by weight; and the wetting agent is polyvinyl alcohol and is present in an amount of about 0.01 to 2% by weight.

* * * * *